Jan. 15, 1963 R. L. ROPIEQUET 3,074,020

BISTABLE MULTIVIBRATOR WHICH CHANGES STATES IN RESPONSE TO A SINGLE LIMITED RANGE, VARIABLE INPUT SIGNAL

Filed Nov. 24, 1959 2 Sheets-Sheet 1

INVENTOR.
RICHARD L. ROPIEQUET
BY
Buckhorn, Cheatham & Blore
ATTORNEYS

INVENTOR.
RICHARD L. ROPIEQUET
BY
Buckhorn, Cheatham, & Blore
ATTORNEYS

United States Patent Office 3,074,020

Patented Jan. 15, 1963

3,074,020

BISTABLE MULTIVIBRATOR WHICH CHANGES STATES IN RESPONSE TO A SINGLE LIMITED RANGE, VARIABLE INPUT SIGNAL

Richard L. Ropiequet, Portland, Oreg., assignor to Teltronix, Inc., Portland, Oreg., a corporation of Oregon Filed Nov. 24, 1959, Ser. No. 855,201
4 Claims. (Cl. 328—194)

This invention relates to a bistable circuit and more particularly to a circuit which will change back and forth between its two stable states as the result of a variable input signal being applied to an input portion of the circuit, the change from one stable state to the other occurring each time the input signal passes in the same direction through the opposite limits of a very small range of input signal variations.

The bistable circuit of the present invention includes a pair of first amplifying devices connected in a bistable circuit portion so that in each stable state of such circuit portion the steady state signals applied to the control electrodes of such pair of devices are displaced in opposite directions from a predetermined value. The bistable circuit portion may be caused to change to its other stable state by applying signals to such control electrodes in directions opposite to the displacements of such steady state values and the result is that the signal on each such control grid then becomes displaced in the opposite direction with respect to its previous displacement from such predetermined value and the bistable circuit portion is then held in its other stable state.

The bistable circuit also includes a pair of control amplifying devices connected in a control circuit portion and having outputs connected to apply control signals respectively to the control electrodes of the first devices. The second or control devices are connected so that the output signals of such devices vary in opposite directions with respect to each other when an input signal variation is applied to the control electrode of one of such control devices through an input circuit portion. The result is that the circuit changes from one stable state to the other whenever the input signal passes in the same direction through the opposite limits of a predetermined small range of signal variations. The predetermined range of signal variation can be made very small so that the circuit becomes extremely sensitive and may be caused to change back and forth between its two stable states by a very small change in input signal.

The circuit is such that the control electrode of the other control amplifying device may be employed to simultaneously vary the limits of the range of signal variation discussed above, either upwardly or downwardly, so that a change from one stable state of the circuit to the other stable state can be produced at any selected value of input signal within wide limits. Thus the control electrode of such other control device may be connected to an adjustable circuit portion arranged to adjustably vary the value of the steady state signal applied to such control electrode. This enables the selection of the values of input signal which will cause the circuit to change from one stable state to another by the mere adjustment of an adjustable voltage or current control device, such as a potentiometer connected across a voltage or current source.

The specific circuits disclosed in the present application are particularly useful in providing trigger pulses for the operation of the sweep circuit of a cathode ray oscilloscope. Such trigger pulses can be produced at substantially any selected value of a varying input signal. The preferred circuits are entirely symmetrical circuits and the output electrodes of the pair of amplifying devices forming the bistable portion of the circuit are preferably connected to the opposite ends of a center tapped primary winding of an output transformer, whioch winding has its center tap connected to a suitable source of electric power.

In the embodiments employing vacuum tube amplifying devices, either the plates or the cathodes may function as the output electrodes and in the embodiments employing transistors, either the collectors or the emitters may function as the output electrodes. The output transformer may have a secondary winding connected to an output circuit and such transformer is perferably of the peaking type such that increase of current in one of the two halves of the primary winding and decrease of current in the other of the two halves due to change of the bistable circuit from one stable state to the other produces a peaked voltage output pulse across the secondary winding. It will be appreciated that a voltage peak in one direction will be produced in the secondary winding when the bistable circuit changes from one stable state to the other and that a voltage peak in the opposite direction will be produced upon the reverse change. By suitable switching arrangements either type of peak may be made a negative or positive peak and by a suitable clamping circuit either negative peaks or positive peaks can be eliminated so that either a negative or positive output peak can be produced whenever the input voltage passes in either direction through substantially any signal value within the capabilities of the device.

It is therefore an object of the present invention to provide a bistable circuit which may be caused to change back and forth between its stable states by a very small range of input signal variation.

Another object of the invention is to provide a bistable circuit in which an amplified input signal variation is applied in opposite directions to the control electrodes of a pair of amplifying devices connected in a bistable circuit portion so that a very small input signal variation is effective to cause the circuit to change back and forth between its stable states and in which circuit the limits of input signal variation causing such changes from one steady state to the other may be simultaneously adjusted in the same direction.

A further object of the invention is to provide a symmetrical bistable circuit in which a very small range of signal variation applied to an input electrode thereof will produce sharp peaks of voltage whenever such signal variation passes in the same direction through the opposite limits of a small range of signal variation.

Other objects and advantages of the invention will appear in the following description of preferred embodiments shown in the attached drawing of which:

Figure 1:
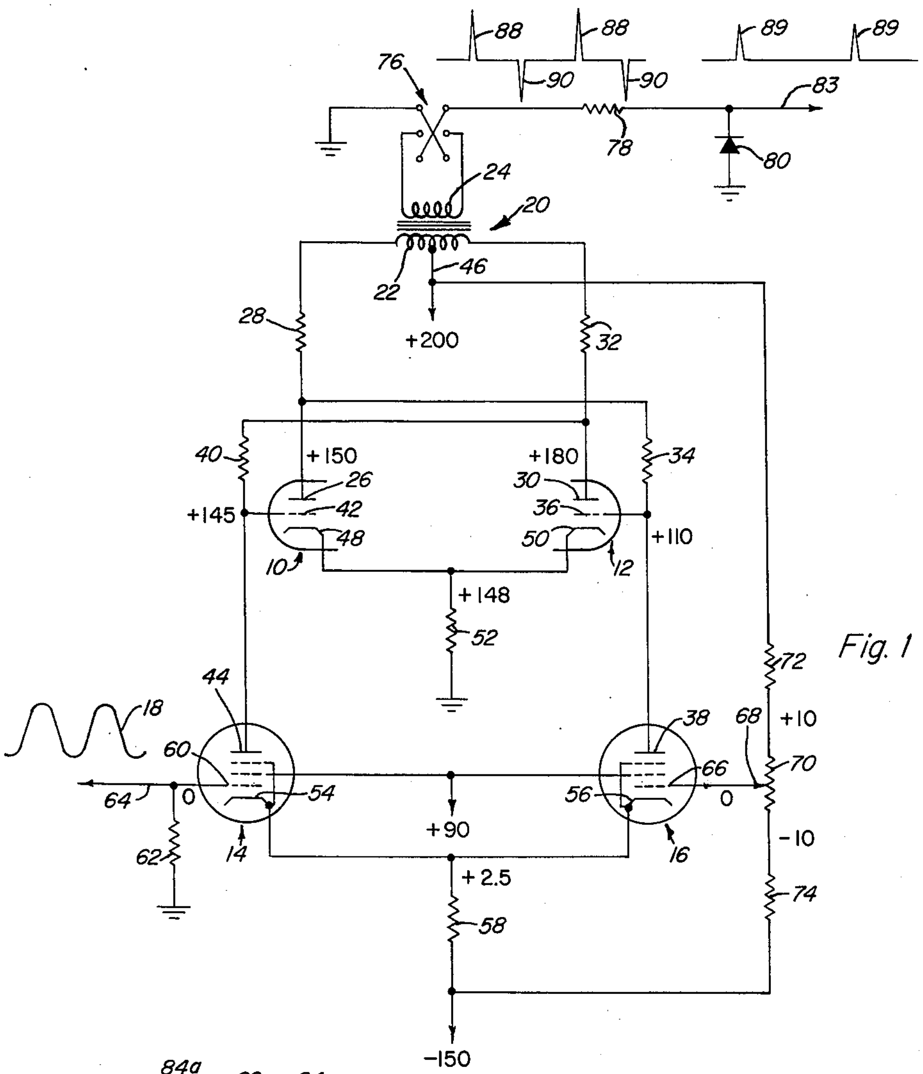
FIG. 1 is a schematic diagram of a bistable circuit in accordance with the present invention employing vacuum tube amplifying devices.

Referring more particularly to FIG. 1 of the drawings, the bistable circuit shown therein includes a pair of first electron discharge tubes 10 and 12 and also a pair of second electron discharge tubes 14 and 16. The tubes 10 and 12 are connected to provide a bistable circuit portion whereas the tubes 14 and 16 are control tubes connected to provide amplified reversely varying voltages which are supplied to the control grids of the tubes 10 and 12 whenever a voltage variation such as that represented by the curve 18 is supplied to the input of the tube 14. The circuit shown also includes a transformer 20 having a center tapped primary winding 22 and a secondary winding 24.

The plate 26 of the tube 10 is connected to one end of the transformer primary winding 22 through the load resistor 28 and similarly the plate 30 of the tube 12 is connected to the other end of the winding 22 through a load resistor 32 which may be of the same value as the resistor 28. The plate 26 of the tube 10 is also connected through a resistor 34 to the control grid 36 of the tube 12. The control grid 36 is directly connected to the plate 38 of the control tube 16 so that the resistor 28 also becomes partly a load resistor for the plate 38 of the tube 16 and the resistor 34 is an additional load resistor for such plate. Similarly, the plate 30 of the tube 12 is connected through a resistor 40 to the control grid 42 of the tube 10. The control grid 42 is directly connected to the plate 44 of the control tube 14 so that the resistor 32 also becomes partly a load resistor for the plate 44 of the tube 14 and the resistor 40 becomes an additional load resistor for such plate. The plates 26, 30, 44 and 38 of the tubes 10, 12, 14 and 16 respectively, are supplied with positive potential from a suitable source (not shown) through the center tap 46 of the transformer winding 22 and the various load resistors 28, 32, 40 and 34. The cathodes 48 and 50 of the tubes 10 and 12 are connected together and to ground through the resistor 52. As discussed below the value of the resistor 52 is such that the cathodes 48 and 50 are maintained at a substantial positive potential with respect to ground.

The cathodes 54 and 56 of the tubes 14 and 16 respectively, are connected together and to a negative source of potential through the resistor 58. The value of the resistor 58 is such that the cathodes 54 and 56 are maintained at an average value somewhat positive but not far removed from ground potential but which average potential may be adjustably varied through a range of voltages as also discussed below.

The control grid 60 of the tube 14, which is the input electrode of the circuit shown, is connected to ground through a resistor 62 which will ordinarily be of a value such that the input signal or voltage variation indicated by the curve 18 is substantially all applied to the control grid 60 through the conductor 64 while the average potential of the grid 60 is ground potential.

The control grid 66 of the control tube 16 is connected to an adjustable tap 68 of a variable resistor 70 which may have its terminals connected between a point of positive potential and a point of negative potential shown in the drawing as being obtained through suitable voltage dropping resistors 72 and 74 from the positive and negative voltage sources for the plates of the tubes and for the cathodes of the control tubes respectively.

The output or secondary winding 24 of the transformer 20 has its opposite terminals connected through a reversing switch indicated at 76 to ground and to an output circuit including a resistor 78. The output side of the resistor 78 is connected to ground through a diode 80 and to an output conductor 83.

In the operation of the circuit of FIG. 1, the bistable portion of the circuit including the tubes 10 and 12 will either be in one stable state in which the tube 10 is conducting and the tube 12 is cut off, or in the other stable state in which the tube 12 is conducting and the tube 10 is cut off. For purposes of explanation, it is first assumed that the adjustable tap 68 of the resistor 70 is in the zero voltage position and that the grid 60 of the tube 14 is also at zero potential. It will also be assumed that the circuit is in the first stable state referred to, namely, that the tube 10 is conducting and the tube 12 is cut off. Possible values of the potentials upon the various electrodes of the tubes 10 and 12 under these conditions have been indicated upon the drawing but it is understood that these values of potential are merely illustrative, since such values will depend upon the voltages supplied from the voltage sources and upon the values of the various resistors as well as the characteristics of the tubes selected. Thus the potential on the cathodes 48 and 50 of the tubes 10 and 12 may, for example, be +148 volts and the steady state potential on the control grid 42 of the tube may be +145 volts so that the grid 42 has a negative bias with respect to the cathode 48 but so that tube 10 is nevertheles conducting. On the other hand, the steady state potential on the control grid 36 of the tube 12 may be +110 volts so that such grid has a negative bias of 38 volts with respect to the cathode 50 and the tube 12 is thereby rendered substantially non conducting. Since the tube 10 is conducting, and the tube 12 is non conducting, the plate 26 of the tube 10 is less positive than the plate 30 of the tube 12. This difference between the potentials of the plates 26 and 30 is a major factor in setting the stead state potentials on the grids 36 and 42 respectively, as discussed below.

The tubes 14 and 16 remain conducting at all times and currents through the tubes 14 and 16 flow through the plate load resistors 32 and 28 respectively, of the tubes 10 and 12 respectively, as well as through the plate load resistors 40 and 34 respectively. The tubes 10 and 12 may be triodes but it is preferable to employ pentodes for the tubes 14 and 16, since the plates currents of such tubes are largely independent of the plate to cathode voltages impressed on such tubes and depend almost entirely upon the screen grid to cathode voltages impressed on such tubes and the potentials of the control grids of such tubes with respect to the cathodes of such tubes. For a given setting of the tap 68 of the adjustable resistor 70 and in the absence of a signal upon the input conductor 64, the screen grid to cathode voltage of each of the tubes 14 and 16 remains substantially constant so that the plate current of such tubes is substantially the same for either steady state of the bistable circuit portion. This means that under the conditions stated, a given difference of potential on the plates 26 and 30 of the tubes 10 and 12 respectively, produces the same given difference of potential on the grids 36 and 42 respectively of such tubes.

Figure 2:
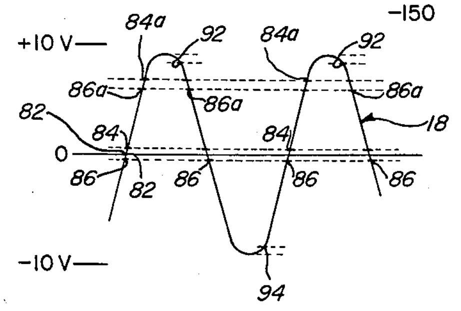
FIG. 2 is a graphical representation of a curve useful in explaining the operation of the circuits of the present invention.

When no input signal voltage variation is applied to the control grid 60 of the tube 14, the potential thereon is zero and such potential may be indicated by the point 82 on the input voltage curve 18 of FIG. 2. With the tap 68 of the resistor 70 set at zero potential, the positive limit of the range of voltage variation which will not cause a change of the circuit from one stable state to the other may be indicated by the point 84 on the curve 18 and the negative limit of such range by the point 86 on such curve. Thus when the grid 60 of the tube 14 is driven in a positive direction by the signal 18, the plate 44 of such tube and consequently the grid 42 to the tube 10 is driven in a negative direction because of greater current flow through the resistors 32 and 40 due to greater current flow through the plate-cathode circuit of the tube 14. At the same time, the greater current flow through the plate-cathode circuit of the tube 14 causes a greater voltage drop across the common cathode resistor 58 so that the cathodes 54 and 56 of the tubes 14 and 16 partly follow the voltage variation applied to the grid 60 of the tube 14. This means that the cathode 56 of the tube 16 is driven in a positive direction with respect to the control grid 66 thus decreasing the plate to cathode current flow through the tube 16. The resulting decreased current flow through the resistors 28 and 34 causes the grid 36 of the tube 12 to be driven in a positive direction to increase the current through the tube 12 and thus through the resistor 32. The effect is cumulative, the plate 26 of the tube 10 is driven in a positive direction to further increase the voltage upon the grid 36 of the tube 12 and the plate of the tube 12 is driven in a negative direction to further decrease the voltage upon the control grid 42 of the tube 10. The result is that the bistable portion of the circuit changes to its other stable state in which the tube 10 is cut off and the tube 12 is conducting whenever the variable voltage 18 applied to the grid 60 of the tube 14 increases in a positive direction and passes the limit 84 of the range of voltage variation referred to above. As long as the potential on the control grid 60 of the tube 14 is more positive than that represented by the point 82 of FIG. 2, the circuit stays in its second stable state. However, when the voltage variation applied to the grid 60 of the tube 14 moves in a negative direction through the voltage represented by the upper limit 84 and continues in the same direction through the voltage represented by the lower limit 86, the circuit again changes back to its first mentioned stable state and remains in such state until the voltage variation again passes through both limits represented by the points 84 and 86 while varying in a positive direction. It will be apparent that input voltage variations within the range between the two limits discussed or entirely outside the limits will produce no change in the bistable circuit and the same is true of variations starting without the range and passing back and forth through one limit without passing through the other limit.

In one position of the switch 76, the abrupt change of current through the halves of the transformer winding 22 due to change of plate current in the tubes 10 and 12 produces a positive output voltage peak 88 whenever a positive going voltage variation passes through the limit 84 after passing through the limit 86 and produces a negative peak 90 whenever a negative going voltage variation passes through the limit 86 after passing through the limit 84. The resistor 78 and diode 80 may be employed to eliminate negative peaks 90 to leave only positive peaks 89 of somewhat smaller amplitude. Reversal of the switch 76 will convert the negative peaks 90 into positive peaks 84 so that positive peaks will correspond to a negative going voltage variation 18 passing through limit 86 after passing through limit 84 and it will be apparent that reversing the connections to the diode 80 will provide negative output peaks rather than positive output peaks 89.

Adjusting the variable tap 68 of the resistor 70 in a positive direction, will move the limits 84 and 86 in a positive direction, for example, to the limits **84*a* and 86*a* on the curve 18. The circuit will change from one stable state to the other whenever a positive going voltage applied to the grid 60 of the tube 14 passes the limit 84*a* after passing through the limit 86*a* and will change back again when a negative going voltage passes through the limit 86*a* after passing through the limit 84*a*. It will be apparent that either positive or negative peaks may be produced at any voltage values along the curve 18 except for values represented by small portions of the curve at 92 and 94 immediately following the greatest positive and negative amplitudes of the curve 18. These portions of the curve can be made very small. Thus adjusting the tap 68 on the resistor 70 sets the voltages at which output peaks are produced by either a negative or positive going input voltage. It will, of course, be apparent that the variable voltage 18 applied to the control grid 60 of the tube 14 need not be along the smooth curve shown but such voltage may have any shape and need not be periodic, since transient pulses will also actuate the bistable circuit of the present invention when applied to the grid 60 of the tube 14. It will be further apparent that the circuit of the present invention may be entirely symmetrical and that the functions of the tubes 14 and 16 may be interchanged so that the input voltage variation can be applied to the control grid 66 of the tube 16 and an adjustable voltage to the control grid of the tube 14. The circuit is actually a voltage comparison circuit, since the particular stable state of the two stable states of the circuit in which the circuit remains depends entirely upon whether the voltage applied to one of the control grids 60 or 66 of the tubes 14 and 16** respectively, exceeds or is less than the voltage applied to the other of such control grids by a small predetermined amount.

While the tubes 10 and 12 have been described as triodes, other amplifying tubes having at least a plate, a cathode and a control grid may be employed. Also the tubes 14 and 16 have been described as pentodes because of their favorable operating characteristics, but triodes or other tubes having at least a plate, a cathode and a control grid can be made to operate in the circuit with somewhat reduced effectiveness.

Figure 3:
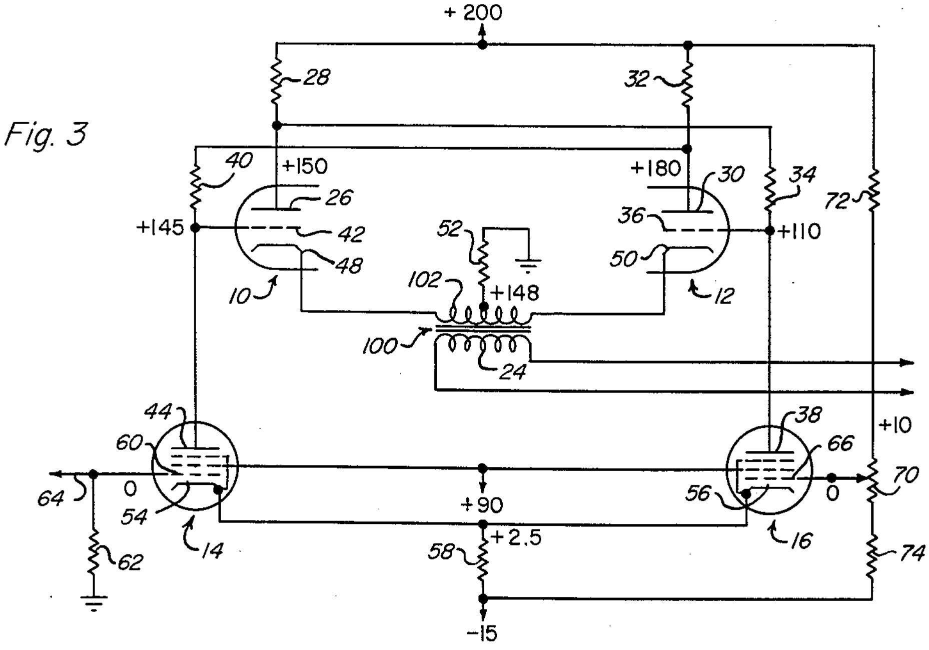
FIG. 3 is a view similar to FIG. 1, showing a modified circuit employing vacuum tube amplifying devices.

The circuit of FIG. 3 is the same as that of FIG. 1 except that a transformer 100 having a center tapped primary winding 102 has been substituted for the transformer 20 of FIG. 1. The primary winding 102 has its ends connected to the cathodes 48 and 50 of the tubes 10 and 12 respectively, instead of to the plates 26 and 30 of such tubes. Also the center tap of the winding 100 is connected to ground through the cathode resistor 52 instead of to a source of positive potential. Otherwise the circuit of FIG. 3 is the same as that of FIG. 1 and the same reference characters have been applied to the corresponding elements. Thus the secondary winding 24 of the transformer 100 of FIG. 3 may be the same as the secondary winding of the transformer 20 of FIG. 3 and may be connected to any suitable output circuit such as the circuit connected to the secondary transformer winding 24 of FIG. 1.

The operation of the circuit of FIG. 3 is the same as that of FIG. 1 with the exception that the cathode currents only of the tubes 10 and 12 alternately flow through the two sides of the primary winding 102 of FIG. 3, whereas the plate currents of the tubes 14 and 16 also flow through the primary winding 22 of FIG. 1. Otherwise the discussion of the circuit of FIG. 1 is applicable to the circuit of FIG. 3.

Figure 4:
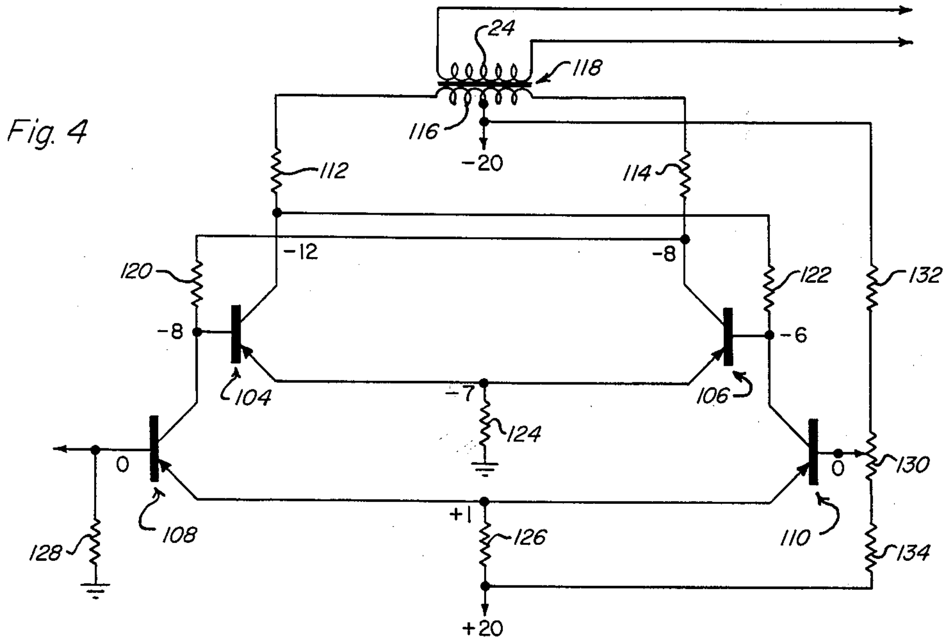
FIG. 4 is a view similar to FIG. 1, showing a modified circuit employing transistors.

The circuit of FIG. 4 is very similar to the circuit of FIG. 1 but includes a first pair of PNP transistors 104 and 106 connected to form a bistable circuit portion and a pair of control transistors 108 and 110 also shown as being of the PNP type. The collectors of the transistors 104 and 106 are connected through load resistors 112 and 114 respectively, to the ends of a center tapped primary winding 116 of a transformer 118 having a secondary winding 24 which may be the same as the secondary winding 24 of the transformers of FIGS 1 and 3. The center tap of the primary winding 116 is connected to a suitable source of negative potential. The base of the transistor 104 is connected through a resistor 120 to the collectors of the transistors 106 and also to the collectors of the control transistors 108. Similarly the base of the transistor 106 is connected through a resistor 122 to the collector of the transistor 104 and to the collector of the transistor 108. The resistors 114 and 120 thus function as collector load resistors for the transistor 108 and the resistors 112 and 122 function as collector load resistors for the transistor 110.

The emitters of the transistors 104 and 106 are connected together and then connected to ground through a resistor 124 which maintains such emitters at a negative potential with respect to ground. The emitters of the transistors 108 and 110 are also connected together and then to a source of positive potential through a resistor 126 which maintains such emitters close to ground potential but a potential slightly positive with respect to their bases so that the transistors 108 and 110 are normally conducting. The base of the emitter 108 is connected to ground through a resistor 128 and the base of the transistor 110 is connected to an adjustable source of voltage or current provided by a potentiometer 130 which is connected between the negative and positive sources of potential referred to above through resistors 132 and 134 respectively.

Assuming that the bistable circuit portion is in the stable state where the transistor 104 is conducting and the transistor 106 is cut off, and with a suitable selection of transistors, possible values of potentials on the various electrodes are indicated in FIG. 4. If the potential of the base of the transistor 108 is driven in a negative direction by an input signal, current flow in both the emitter and collector circuits thereof increases and the collector is driven in a positive direction so that the base of the transistor 104 becomes less negative. At the same time the emitters of the transistors 108 and 134 are driven in negative direction so that the collector of the transistor 110 is driven in a negative direction and the base of the transistor 106 becomes more negative. This is the condition causing the bistable circuit including the transistors 104 and 106 to change to the other stable state in which the transistor 106 is conducting and the transistor 104 is cut off. That is to say, the transistors 108 and 110 amplify the signal applied to the base of the transistor 108 and supply it in reversed directions to the two transistors 104 and 106.

If the potentials shown on the curve of FIG. 2 are reversed and decreased in magnitude, and the terms base, collector and emitter substituted for the terms grid, plate and cathode, everything said with respect to the curve of FIG. 2 is applicable to the circuit of FIG. 3 in the same manner as it is applicable to FIG. 1. It will be apparent that NPN type transistors can be substituted for the PNP transistors shown in FIG. 4 by reversing the potentials of the power sources without changing the essential operation of the circuit.

I claim:

1. A multivibrator circuit having two stable states, comprising:

a pair of main amplifying devices, a control amplifying device associated with each of said main amplifying devices, each of said amplifying devices having first and second electrodes providing a controlled circuit and having a control electrode for said controlled circuit, circuit means connecting electrodes of said devices and a voltage source to provide one said stable state in which the controlled circuit of one main device is in conducting condition and the controlled circuit of the other main device is in non-conducting condition and a second said stable state in which the conducting conditions of said controlled circuits are reversed, said circuit means including, means for supplying control voltages to the control electrodes of said control devices including means for applying a varying control voltage from a source external of said multivibrator circuit to the control electrode of one of said control devices, connection means for the electrodes of said control devices for producing by amplifier action of both said control devices an amplified voltage on the first electrode of one control device which decreases as the control voltage on the control electrode of said one control device increases and which increases as the voltage on the control electrode of the other control device increases and vice versa, and means connecting the first electrode of each of said control devices to the control electrode of its associated main device for supplying said amplified voltages to the control electrodes of said main devices to control the changing of said multivibrator from one stable state to the other.

2. A multivibrator circuit having two stable states, comprising:

a pair of main amplifying devices, a control amplifying device associated with each of said main amplifying devices, each of said amplifying devices having first and second electrodes providing a controlled circuit and having a control electrode for said controlled circuit, circuit means connecting electrodes of said devices and a voltage source to provide one said stable state in which the controlled circuit of one main device is in conducting condition and the controlled circuit of the other main device is in non-conducting condition and a second said stable state in which the conducting conditions of said controlled circuits are reversed, said circuit means including, means for supplying control voltages to the control electrodes of said control devices including means for applying a varying control voltage from a source external of said multivibrator circuit to the control electrode of one of said control devices, connection means for the electrodes of said control devices for producing by amplifier action of both said control devices an amplified voltage on the first electrode of one control device which decreases as the control voltage on the control electrode of said one control device increases and which increases as the voltage on the control electrode of the other control device increases and vice versa, and means connecting the first electrode of each of said control devices to the control electrode of its associated main device for supplying said amplified voltages to the control electrodes of said main devices to control the changing of said multivibrator from one stable state to the other, said means for supplying control voltages including means for supplying an adjustable D.C. voltage to the control electrode of one said control devices.

3. A multivibrator circuit having two stable states, comprising:

a pair of main amplifying devices, a control amplifying device associated with each of said main amplifying devices, each of said amplifying devices having first and second electrodes providing a controlled circuit and having a control electrode for said controlled circuit, circuit means connecting electrodes of said devices and a voltage source to provide one said stable state in which the controlled circuit of one main device is in conducting condition and the controlled circuit of the other main device is in non-conducting condition and a second said stable state in which the conducting conditions of said controlled circuits are reversed and for providing a range of control voltages on the control electrode of one of the control devices in which said multivibrator can be in either of its stable states, said circuit means including, means for supplying control voltages to the control electrodes of said control devices including means for applying a varying control voltage from a source external of said multivibrator circuit to the control electrode of one of said control devices, connection means for the electrodes of said control devices for producing by amplifier action of both said control devices an amplified voltage on the first electrode of one control device which decreases as the control voltage on the control electrode of said one control device increases and which increases as the voltage on the control electrode of the other control device increases and vice versa, and means connecting the first electrode of each of said control devices to the control electrode of its associated main device for supplying said amplified voltages to the control electrodes of said main devices to control the changing of said multivibrator from one stable state to the other, said means for supplying control voltages including means for supplying an adjustable D.C. voltage to the control electrode of the other of the control devices to shift said range of voltages and means for supplying a variable voltage to the control electrode of said one control device.

4. A multivibrator circuit having two stable states, comprising:

a pair of main amplifying devices, a control amplifying device associated with each of said main amplifying devices, each of said amplifying devices having first and second main electrodes providing a controlled circuit and having a control electrode for said controlled circuit, circuit means connecting electrodes of said devices and a voltage source to provide one said stable state in which the controlled circuit of one main device is in conducting condition and the controlled circuit of the other main device is in non-conducting condition and a second said stable state in which the conducting conditions of said controlled circuits are reversed, said circuit means including, means for supplying control voltages to the control electrodes of said control devices including means for applying a varying control voltage from a source external of said multivibrator circuit to the control electrode of one of said control devices, connection means for the electrodes of said control devices for producing by amplifier action of both said control devices an amplified voltage on the first electrode of one control device which decreases as the control voltage on the control electrode of said one control device increases and which increases as the voltage on the control electrode of the other control device increases and vice versa, and means connecting the first electrode of each of said control devices to the control electrode of its associated main device for supplying said amplified voltages to the control electrodes of said main device to control the changing of said multivibrator from one stable state to the other, said circuit means including a transformer having a center tapped primary winding with its end terminals connected to similar main electrodes of said main amplifying devices and its center terminal connected to said source and having a secondary winding providing a peaked output voltage when said multivibrator changes from one of its stable state to the other.

References Cited in the file of this patent

UNITED STATES PATENTS

| | | |
|---|---|---|
| Re. 23,770 | Bergfors | Jan. 12, 1954 |
| 2,447,507 | Kenyon | Aug. 24, 1948 |
| 2,545,924 | Johnstone | Mar. 20, 1951 |
| 2,759,104 | Skellett | Aug. 14, 1956 |
| 2,762,917 | Sharin et al. | Sept. 11, 1956 |
| 2,772,356 | Rich | Nov. 27, 1956 |
| 2,846,583 | Goldfisher et al. | Aug. 5, 1958 |
| 2,898,479 | McElroy | Aug. 4, 1959 |
| 2,997,605 | Fortini et al. | Aug. 22, 1961 |

UNITED STATES PATENT OFFICE

CERTIFICATE OF CORRECTION

Patent No. 3,074,020 January 15, 1963

Richard L. Ropiequet

It is hereby certified that error appears in the above numbered patent requiring correction and that the said Letters Patent should read as corrected below.

In the grant, lines 2 and 12, and in the heading to the printed specification, lines 5 and 6, for "Teltronix, Inc.", each occurrence, read -- Tektronix, Inc. --; column 2, line 2, for "whioch" read -- which --; line 10, for "perferably" read -- preferably --; column 7, line 15, for "supply" read -- apply --.

Signed and sealed this 3rd day of September 1963.

(SEAL)
Attest:

ERNEST W. SWIDER
Attesting Officer

DAVID L. LADD
Commissioner of Patents